(12) United States Patent
Endo (10) Patent No.: US 7,529,477 B2
(45) Date of Patent: May 5, 2009

(54) IMAGE-TAKING APPARATUS (75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 413 days.

(21) Appl. No.: 11/436,659

(22) Filed: May 19, 2006

(65) Prior Publication Data

US 2006/0263077 A1 Nov. 23, 2006

(30) Foreign Application Priority Data

May 20, 2005 (JP) ............................. 2005-148258

(51) Int. Cl.
*G03B 15/02* (2006.01)
*G03B 7/00* (2006.01)
(52) U.S. Cl. ..................... 396/61; 396/65; 396/155; 396/161; 348/362
(58) Field of Classification Search .................. 396/65, 396/67, 80, 155, 157, 159, 161, 166–167, 396/233–234, 61; 348/220.1, 221.1, 222.1, 348/362–364, 366, 370
See application file for complete search history.

(56) References Cited

U.S. PATENT DOCUMENTS

| 5,614,970 A | * | 3/1997 | Takagi et al. | ................. 396/164 |
| 2006/0193622 A1 | * | 8/2006 | Endo | .......................... 396/157 |

FOREIGN PATENT DOCUMENTS

| JP | 2001-215579 A | 8/2001 |
| JP | 2004-242123 A | 8/2004 |

* cited by examiner

*Primary Examiner*—Bot LeDynh
(74) *Attorney, Agent, or Firm*—Sughrue Mion, PLLC (57) ABSTRACT

An image-taking apparatus includes a lighting section having LEDs that individually correspond to areas, into which a field is divided, and that each emit light to the corresponding one of the areas. The apparatus also includes a CCD and an AF section. The lighting section is configured to emit light to the field after an amount of emitted light for each of the divided areas is adjusted based on subject brightness information from the CCD and subject distance information from the AF section according to field conditions.

4 Claims, 9 Drawing Sheets

Fig. 9

IMAGE-TAKING APPARATUS

CROSS-REFERENCE TO RELATED PATENT APPLICATION

This application claims the benefit of Japanese Patent Application No. 2005-148258, filed on May 20, 2005, in the Japanese Intellectual Property Office, the disclosure of which is incorporated herein in its entirety by reference.

BACKGROUND OF THE INVENTION

1. Field of the Invention

The present invention relates to an image-taking apparatus that takes a moving image by forming a subject image on an imaging device using an image-taking optical system.

2. Description of the Related Art

The emergence of blue light-emitting diodes has made it possible to generate white light with light-emitting diodes. As a result, there is a trend to replace incandescent lamps consuming a large amount of power with light-emitting diodes (LED) consuming a small amount of power for the purpose of reducing power consumption. Such a trend has been also seen in the field of digital cameras and the LEDs are replacing xenon tubes used for fill in shooting. For example, Japanese Patent Application Publication No. 2001-215579 proposes a technique for emitting a white flash to a subject by causing LEDs of respective colors of red, green and blue to emit light, instead of using a flash of a xenon tube. Also, Japanese Patent Application Publication No. 2004-242123 proposes a technique for causing LEDs of respective colors of red, green and blue to emit light in synchronism with exposure by an imaging device at the time of shooting a moving image.

In recent years, digital cameras capable of shooting moving images have been widespread. During movie shooting, a subject often moves farther or closer with respect to a camera. Therefore, a digital camera capable of movie shooting is required to emit an appropriate amount of flash according to the position of a moving subject. In other words, such a digital camera is required to perform light distribution suitable for movie shooting. However, in the techniques proposed in the above two Japanese Patent Application Publications, a uniform amount of light is emitted to the entire field and therefore, it is difficult to perform light distribution suitable for movie shooting.

SUMMARY OF THE INVENTION

The present invention has been made in view of the above circumstances, and provides an image-taking apparatus capable of performing light distribution suitable for movie shooting.

An image-taking apparatus according to the invention has an imaging device and generates image signals by forming a subject image on the imaging device, including:

a lighting section that emits light to a field by independently controlling an amount of light for each of a plurality of areas into which the field is divided; and a light-amount adjusting section that adjusts an amount of emitted light for each of the plurality of areas according to field conditions.

The image-taking apparatus of the invention is capable of emitting light to a field during movie shooting after an amount of emitted light for each of the divided areas of the field is adjusted according to field conditions. This makes it possible to control light distribution according to the position of a moving subject, thereby achieving light distribution suitable for movie shooting.

Preferably, the image-taking apparatus according to the invention further includes an autoexposure section that measures subject brightness for each of the plurality of areas, and the light-amount adjusting section adjusts an amount of emitted light for each of the plurality of areas based on subject brightness information from the autoexposure section.

This additional feature makes it possible to obtain correct exposure for the entire screen according to the position of a moving subject.

In the image-taking apparatus according to invention, preferably, the autoexposure section measures subject brightness for each of the plurality of areas by using the imaging device.

This additional feature makes it possible to configure a circuit simpler than a case where the autoexposure section includes a dedicated light-receiving element for measuring subject brightness for each of the divided areas.

Preferably, the image-taking apparatus according to the invention further includes an autoexposure section that measures subject brightness for each of the plurality of areas, and an autofocus section that includes a distance-measuring sensor provided independently of the imaging device and measures a subject distance for each of the plurality of areas by using the distance-measuring sensor, wherein the light-amount adjusting section adjusts an amount of emitted light for each of the plurality of areas based on subject brightness information from the autoexposure section and subject distance information from the autofocus section.

It is difficult to obtain distribution information in terms of distance for the entire screen if AF control, so-called hill-climbing method, is employed in movie shooting. In this method, a focus lens is moved along an optical axis to find a focus and a position where contrast based on image signals acquired at an imaging device reaches the largest level is established as a focus point. However, as mentioned above, the image-taking apparatus of the invention may be additionally provided with the above-described autofocus section so that an amount of emitted light for each of the divided areas is adjusted based on subject brightness information from the autoexposure section and subject distance information from the autofocus section. With this additional feature, it is possible to achieve correct exposure for the entire screen according to the position of a moving subject and to perform light distribution according to distance information on a moving subject during movie shooting.

Preferably, in the image-taking apparatus according to the invention, the lighting section includes light-emitting diodes that individually correspond to the plurality of areas and that each emit light to corresponding one of the plurality of areas.

This additional feature makes it possible to perform light distribution suitable for movie shooting while reducing power consumption.

As described above, the image-taking apparatus according to the invention can perform light distribution suitable for movie shooting.

DETAILED DESCRIPTION OF THE INVENTION

Embodiments of the present invention will be described with reference to the drawings.

FIGS. 1(a) and 1(b) show a digital camera 100 according to a first embodiment of the present invention.

FIGS. 1(a) and 1(b) show the front and back of the digital camera 100 according to the first embodiment, as viewed obliquely from above, respectively.

The digital camera 100 shown in FIGS. 1(a) and 1(b) is a camera capable of shooting both still images and moving images by forming a subject image on an imaging device using an image-taking optical system.

Figure 1:
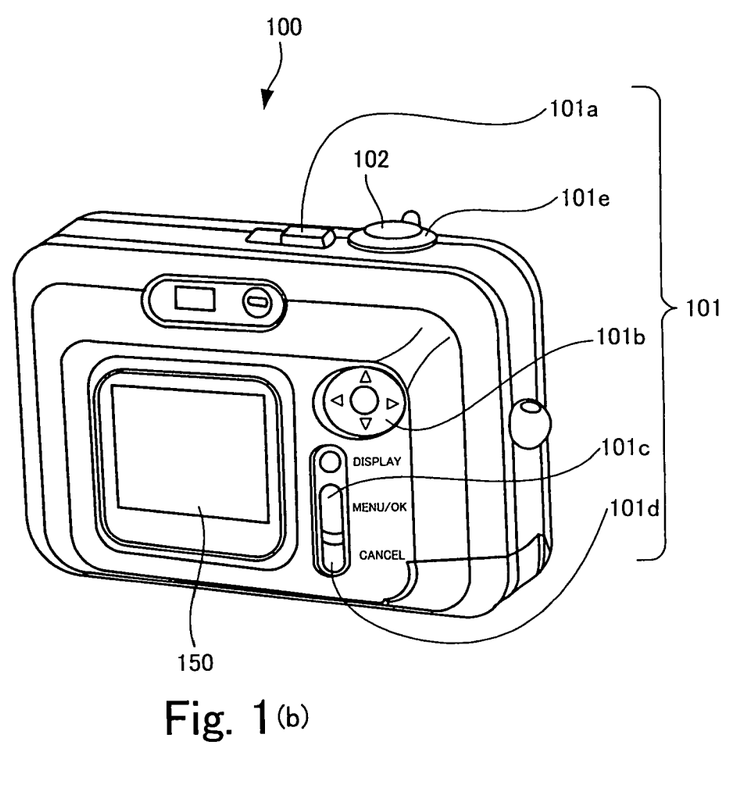
FIGS. 1(a) and 1(b) show a digital camera according to a first embodiment of the present invention.

As shown in FIG. 1 (a), provided at the center of the digital camera 100 of the present embodiment is a lens barrel 170 having therein a built-in image-taking optical system including a shooting lens. An image of a subject is led through the image-taking optical system to a charge coupled device (CCD) serving as an imaging device disposed inside the digital camera 100.

As shown in FIG. 1(a), the digital camera 100 is provided with a lighting section 16 in an upper portion thereof. The lighting section 16 is configured to emit light to a field by independently adjusting a light amount for each of plural areas into which the field is divided during movie shooting. The lighting section 16 includes LEDs 16b1, 16b2, . . . and 16bn.

As shown in FIG. 1(a), the digital camera 100 is also provided with an autofocus (AF) section 20 in an upper portion thereof. The AF section 20 includes an AF light-receiving windows 21 and 22 with a spacing between them. The AF section 20 is configured to measure a subject distance for each of the divided areas by means of so-called triangulation, by receiving reflected light that is natural scattered light (light from the lighting section 16, sunlight, etc.) from a subject with a light-receiving element via the AF light-receiving windows 21 and 22.

Further, as shown in FIG. 1(b), disposed on the back and top of the digital camera 100 is an operating switch group 101 for allowing a user to perform various operations therethrough when using the digital camera 100.

The operating switch group 101 includes a power switch 101a, a release button 102, a cross key 101b, a MENU/OK key 101c, a cancel key 101d, a mode lever 101e and the like. The mode lever 101e is used to switch between a playback mode and a shooting mode and to switch between a moving-image mode and a still-image mode in the shooting mode. When the shooting mode is selected by the mode lever 101e, a through image (live view) is displayed and a user can take an image by pressing the release button 102 while looking at the through image. When the playback mode is selected by the mode lever 101e, a taken image is displayed on a LCD panel 150.

Figure 2:
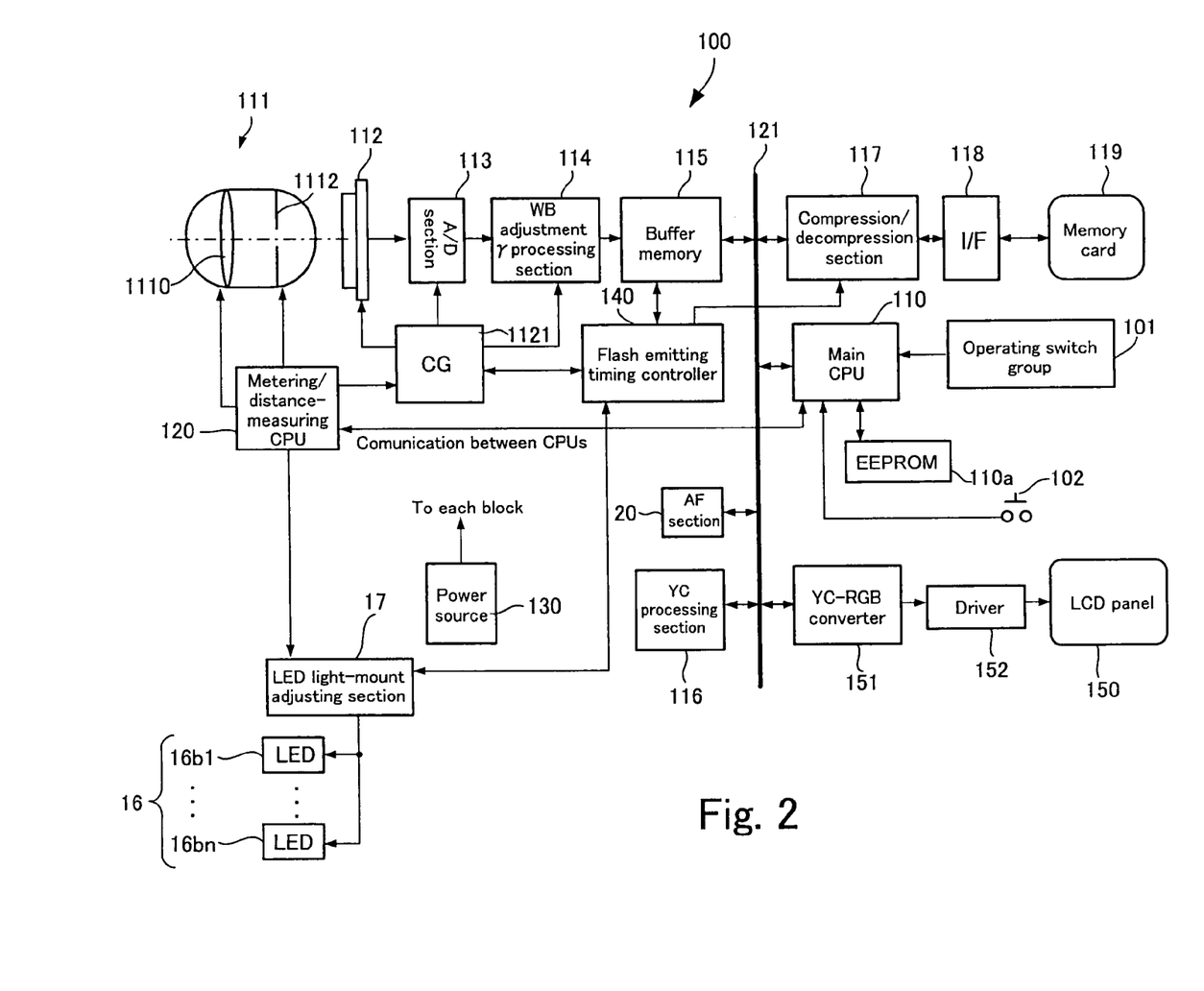
FIG. 2 is a block diagram of the digital camera shown in FIGS. 1(a) and 1(b)

FIG. 2 is a block diagram of the digital camera 100 shown in FIGS. 1(a) and 1(b).

The digital camera 100 of the first embodiment includes a main CPU 110 that controls all processing in the digital camera 100. The main CPU 110 has an input section for receiving operation signals from the operating switch group 101 shown in FIG. 1(b). The main CPU 110 includes an EEPROM 110a that stores a program necessary for the operation of the digital camera 100. When the power switch 101a (see FIGS. 1(a) and 1(b)) of the digital camera 100 having such a configuration is turned on, the main CPU 110 starts controlling all the operation of the digital camera 100 according to procedures described in the program stored in the EEPROM 110a.

As shown in FIG. 2, the digital camera 100 also includes: the AF section 20, a CCD 112, the lighting section 16 having the LEDs 16b1 through 16bn, and a LED light-mount adjusting section 17 for adjusting light amount for each divided area according to field conditions. The LED light-mount adjusting section 17 includes a logic circuit composed of transistors. The CCD 112 serves as an autoexposure (AE) section according to the invention and is configured to measure a subject distance for each of the divided areas to measure subject brightness. Therefore, the configuration of the CCD 112 is simpler than a conventional case where a light receiving element measures subject brightness for each divided area.

When the power switch 101a (see FIGS. 1(a) and (b)) is turned on, the main CPU 110 detects turning on of the power switch 101a and a power source 130 supplies power to blocks such as the main CPU 110, a metering/distance-measuring CPU 120 and the like. If the shooting mode is selected by the mode lever 101e of the operating switch group 101, image signals representing a subject image formed on the CCD 112 are thinned out and output at predetermined intervals so that the subject image represented by the output image signals is displayed on the LCD panel 150. The CCD 112 receives timing signals from a clock generator (CG) 1121. Image signals are thinned out and output at predetermined intervals according to the timing signals. The CG 1121 outputs timing signals under instructions from the main CPU 110. Such timing signals are also sent to, in addition to the CCD 112, an A/D section 113 and a white-balance (WB) adjustment γ processing section 114 which are provided in subsequent stages. Accordingly, in synchronization with the timing signals, image signals are sequentially processed in the CCD 112, the A/D section 113 and the WB adjustment γ processing section 114.

When image signals are converted into digital signals by the A/D section 113 and then subjected to white balance adjustment and γ correction by the WB adjustment γ processing section 114 at predetermined intervals in synchronization with the timing signals from the CG 1121 under instructions from the main CPU 110, it is necessary to well adjust the flow of the image signals. Therefore, subsequent to the WB adjustment γ processing section 114, a buffer memory 115 is provided to adjust timing for transferring image signals to a YC processing section 116 at predetermined intervals. From the buffer memory 115, image signals stored earlier are transferred first to the YC processing section 116 where the image signals are converted into YC signals through RGB-YC signal conversion. The YC signals are then sent via a bus 121 to a YC-RGB converter 151 where the received YC signals are again converted into RGB signals that are then sent to the LCD panel 150 via a driver 152. Based on the received RGB signals, the LCD panel 150 displays an image of a subject. The CCD 112 keeps generating image signals and the A/D section 113 and the WB adjustment γ processing section 114 keep processing the image signals in synchronization with timing signals output from the CG 1121. Therefore, an image of a subject, to which the shooting lens is directed, is continuously displayed on the LCD panel 150. When a user presses the release button 102 while looking at a continuously displayed subject image, after a lapse of predetermined time from the press of the release button 102, all the image signals of a subject image formed on the CCD 112 are output as RGB signals. These RGB signals are converted into YC signals in the YC processing section 116 and the YC signals are then compressed by a compression/decompression section 117. Subsequently, the compressed signals are recorded in a memory card 119 via an interface (I/F) 118. In the compression/decompression section 117, signals of still images are compressed by a compression method in conformity with JPEG standards and stored in the memory card 119 as a file. The file stored in the memory card 119 has a header in which compression information, shooting information, etc. are written. When the playback mode is selected by the mode lever 101e of the digital camera 100, the header of the file is read out from the memory card 119 first. Then, based on the compression information in the header read out, the compressed image signals in the file are decompressed so that the original image signals are restored. Subsequently, a subject image based on the restored original image signals is displayed on the LCD panel 150.

The digital camera 100 of the present embodiment is provided with the metering/distance-measuring CPU 120 for adjusting focus and exposure in addition to the main CPU 110. The metering/distance-measuring CPU 120 controls the position of a shooting lens 1110 and the aperture change of a diaphragm 1112, which compose an image-taking optical system 111.

To measure a subject distance for each divided area, the main CPU 110 gives an instruction to the AF section 20. Upon receipt of the instruction, the AF section 20 measures a subject distance for each divided area using a light-receiving element thereof. Based on subject brightness information from the CCD 112 and subject distance information from the AF section 20, the LED light-mount adjusting section 17 adjusts an amount of emitted light for each divided area according to field conditions. A flash emitting timing controller 140 is provided to precisely control, in cooperation with the CG 1121, the operating timing of the LED light-mount adjusting section 17 that adjusts a light amount of emission from the LEDs 16b1 through 16bn of the lighting section 16.

In the digital camera 100 of the first embodiment, the lighting section 16 is configured to emit light to a field after an amount of light emission for each divided area of the field is adjusted by the LED light-mount adjusting section 17 according to field conditions during movie shooting. Therefore, the digital camera 100 is capable of controlling light distribution according to a position of a moving subject and thus performing light distribution suitable for movie shooting. Also, the LED light-mount adjusting section 17 is configured to adjust an amount of light emission for each divided area based on subject brightness information from the CCD 112 and subject distance information from the AF section 20. Therefore, the digital camera 100 is capable of performing correct exposure for the entire screen according to the position of a moving subject and performing appropriate light distribution according to subject distance information on the subject moving during movie shooting. Further, because the lighting section 16 has the LEDs 16b1 through 16bn that are provided corresponding to the divided areas and configured to emit light to the respective divided areas, the digital camera 100 can perform light distribution suitable for movie shooting while reducing power consumption.

Now, there will be described shooting processing to be performed by the main CPU 110 at the press of the release button 102 after the power switch 101a is turned on and the shooting mode is selected by the mode lever 101e.

Figure 3:
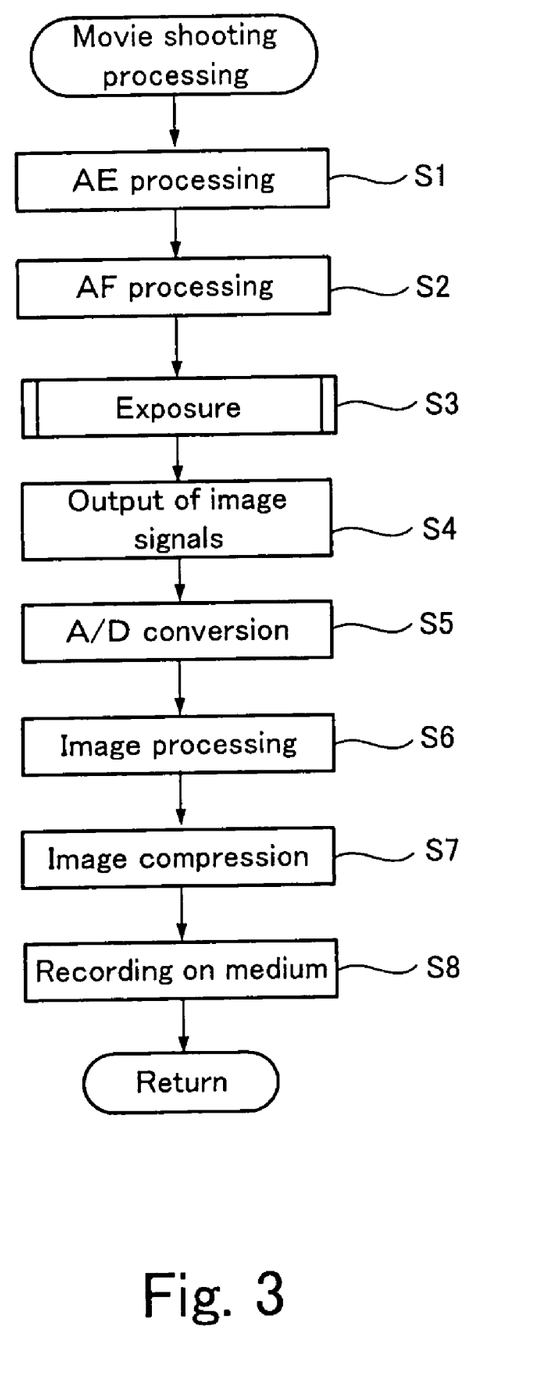
FIG. 3 is a flowchart showing the procedure of shooting processing to be performed by a main CPU.

FIG. 3 is a flowchart showing the procedure of the shooting processing to be performed by the main CPU 110.

First, in response to a half press of the release button 102, the main CPU 110 performs AE processing at step S1 and transmits the result to the metering/distance-measuring CPU 120, thereby causing the metering/distance-measuring CPU 120 to adjust the aperture of the diaphragm 112 based on the result. Subsequently, while the release button 102 is still in the half-press state, the main CPU 110 causes the AF section 20 to perform AF processing at step S2. Subsequently, at step S3, upon detection of a full press of the release button 102, the main CPU 110 instructs the CG 1121 to supply an exposure-starting signal to the CCD 112, thereby causing the CCD 112 to start exposure. Next, at step S4, the main CPU 110 causes the CCD 112 to output image signals to the A/D section 113. Further, at step S5, the main CPU 110 causes the A/D section 113 to convert the image signals in analog form into digital image signals that are then sent to the WB adjustment γ processing section 114. At step S6, the main CPU 110 causes the WB adjustment γ processing section 114 to subject the image signals to image processing and the image signals after the image processing are then output to the buffer memory 115. The image signals received by the buffer memory 115 are then supplied to the YC processing section 116 at appropriate timing where the image signals are subjected to image processing. Subsequently, the main CPU 110 causes the compression/decompression section 117 to compress the image signals at step S7, causes the I/F 118 to record the compressed signals into the memory card 119 at step S8, and the flow ends.

Figure 4:
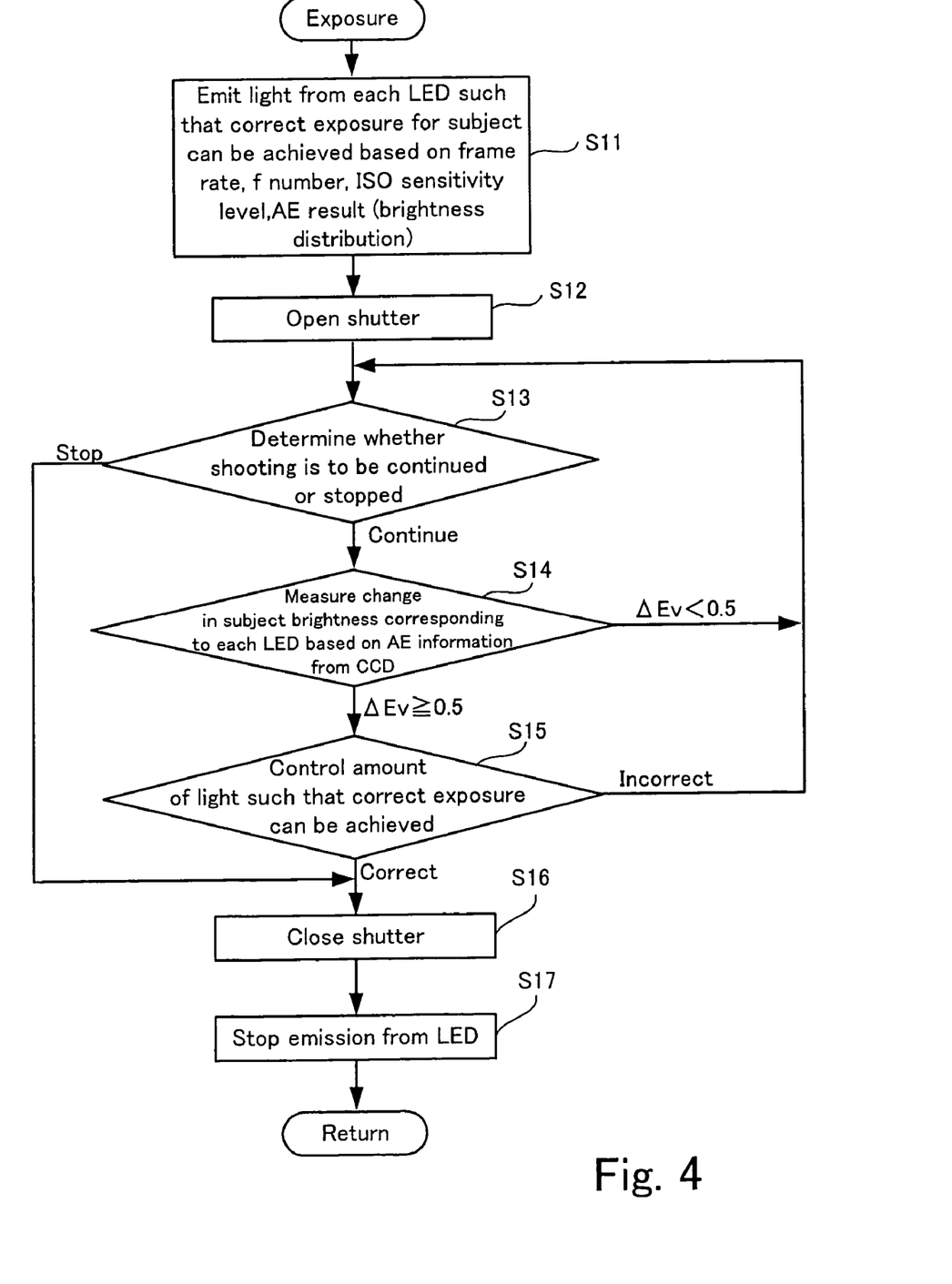
FIG. 4 is a flowchart showing the details of exposure processing at step S3 in FIG. 3.

FIG. 4 is a flowchart showing the details of the exposure processing at step S3.

At step S11, the main CPU 110 causes each LED to emit light such that correct exposure for a subject can be achieved based on frame rate, f number, ISO sensitivity level, and AE result (brightness distribution) Subsequently, at step S12, in response to a full press of the release button 102, the main CPU 110 opens an electronic shutter (and a mechanical shutter if provided) by causing the CG 1121 to supply an exposure-starting signal to the CCD 112, and the flow proceeds to step S13.

At step S13, it is determined whether shooting is to be continued or stopped. If it is determined that the shooting is to be stopped, the flow proceeds to step S16 which will be described later. On the other hand, if it is determined that the shooting is to be continued, the flow proceeds to step S14. At step S14, a change in subject brightness corresponding to each LED is measured based on AE information from the CCD 112. As a result of this measurement, the flow goes back to step S13 when an exposure value ΔEv is below 0.5, whereas the flow proceeds to step S15 when an exposure value ΔEv is 0.5 or more.

At step S15, an amount of light is controlled such that correct exposure can be achieved. Specifically, the flow goes back to step S13 when correct exposure is not achieved whereas the flow proceeds to step S16 when correct exposure is achieved. The shutter is closed at step S16 and subsequently, the emission from LED is stopped at step S17, and the flow ends.

Figure 5:
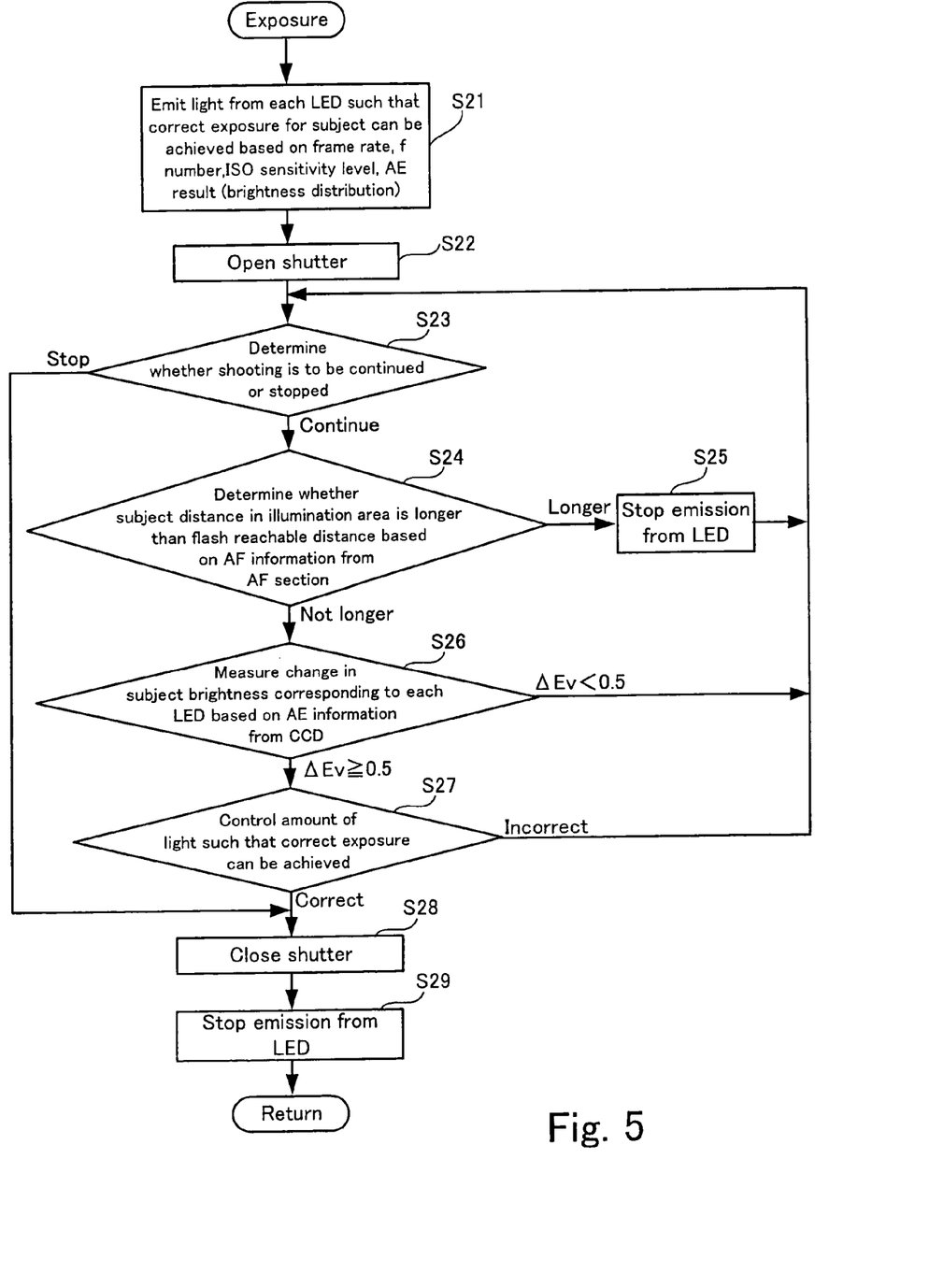
FIG. 5 is a flowchart showing the details of the exposure processing at step S3 in FIG. 3, which is different from the flow shown in FIG. 4.

FIG. 5 is a flowchart showing the details of the exposure processing at step S3 different from the flow shown in FIG. 4.

First, at step S21, the main CPU 110 causes each LED to emit light such that correct exposure for a subject can be achieved based on frame rate, f number, ISO sensitivity level, and AE result (brightness distribution). Subsequently, at step S22, in response to a full press of the release button 102, the main CPU 110 opens an electronic shutter (and a mechanical shutter if provided) by causing the CG 1121 to supply an exposure-starting signal to the CCD 112, and the flow proceeds to step S23.

At step S23, it is determined whether shooting is to be continued or stopped. If it is determined that the shooting is to be stopped, the flow proceeds to step S28 which will be described later. On the other hand, if it is determined that the shooting is to be continued, the flow proceeds to step S24. At step S24, it is determined whether a subject distance in an illumination area is longer than a flash reachable distance based on AF information from the AF section 20. If it is determined that the subject distance is longer than the flash reachable distance, the flow proceeds to step S25. At step S25, the emission of a corresponding LED is stopped and the flow goes back to step S23. This process eliminates waste emission of a corresponding LED, resulting in reduction of power consumption. On the other hand, if it is determined that the subject distance is not longer than the flash reachable distance, the flow proceeds to step S26.

At step S26, a change in subject brightness corresponding to each LED is measured based on AE information from the CCD 112. As a result of this measurement, the flow goes back to step S23 when an exposure value ΔEv is below 0.5, whereas the flow proceeds to step S27 when an exposure value ΔEv is 0.5 or more.

At step S27, an amount of light is controlled such that correct exposure can be achieved. Specifically, the flow goes back to step S23 when correct exposure is not achieved whereas the flow proceeds to step S28 when correct exposure is achieved. The shutter is closed at step S28 and subsequently, the emission from LED is stopped at step S29, and the flow ends.

Figure 6:
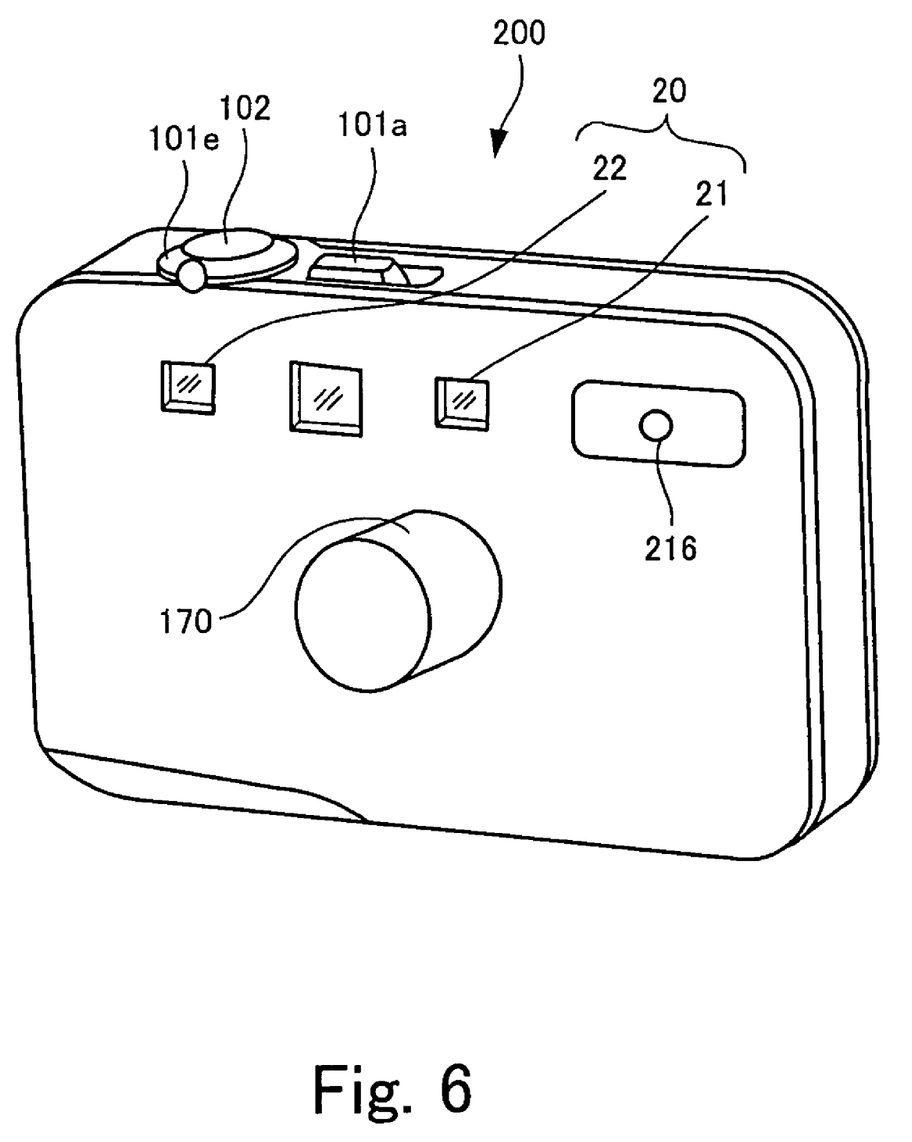
FIG. 6 is a diagram showing a digital camera according to a second embodiment of the present invention.

FIG. 6 is a diagram showing a digital camera 200 according to a second embodiment of the present invention.

FIG. 6 shows the front of the digital camera 200 according to the second embodiment, as viewed obliquely from above. The view of the back of the digital camera 200 is not illustrated because it is the same as FIG. 1(b) showing the back of the digital camera 100.

The digital camera 200 shown in FIG. 6 is the same as the digital camera 100 shown in FIG. 1(a) except that the digital camera 200 has a lighting section 216 including one LED in place of the lighting section 16 including plural LEDs.

Figure 7:
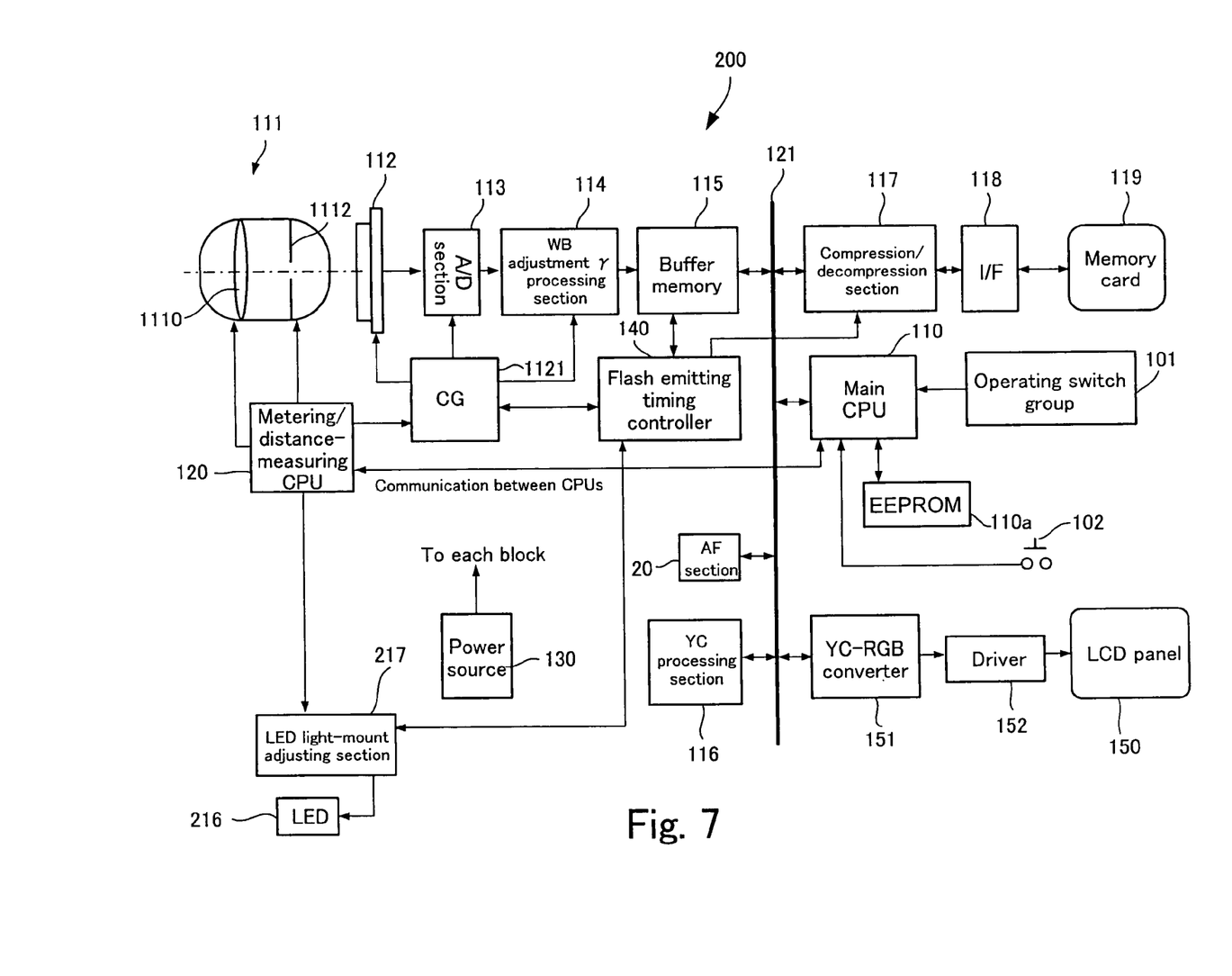
FIG. 7 is a block diagram of the digital camera shown in FIG. 6.

FIG. 7 is a block diagram of the digital camera 200 shown in FIG. 6.

The configuration of the digital camera 200 is the same as that of the digital camera 100 except that the digital camera 200 has, in addition to the lighting section 216, a LED light-mount adjusting section 217 in place of the LED light-mount adjusting section 17 shown in FIG. 2. The LED light-mount adjusting section 217 is a liquid crystal device.

Figure 8:
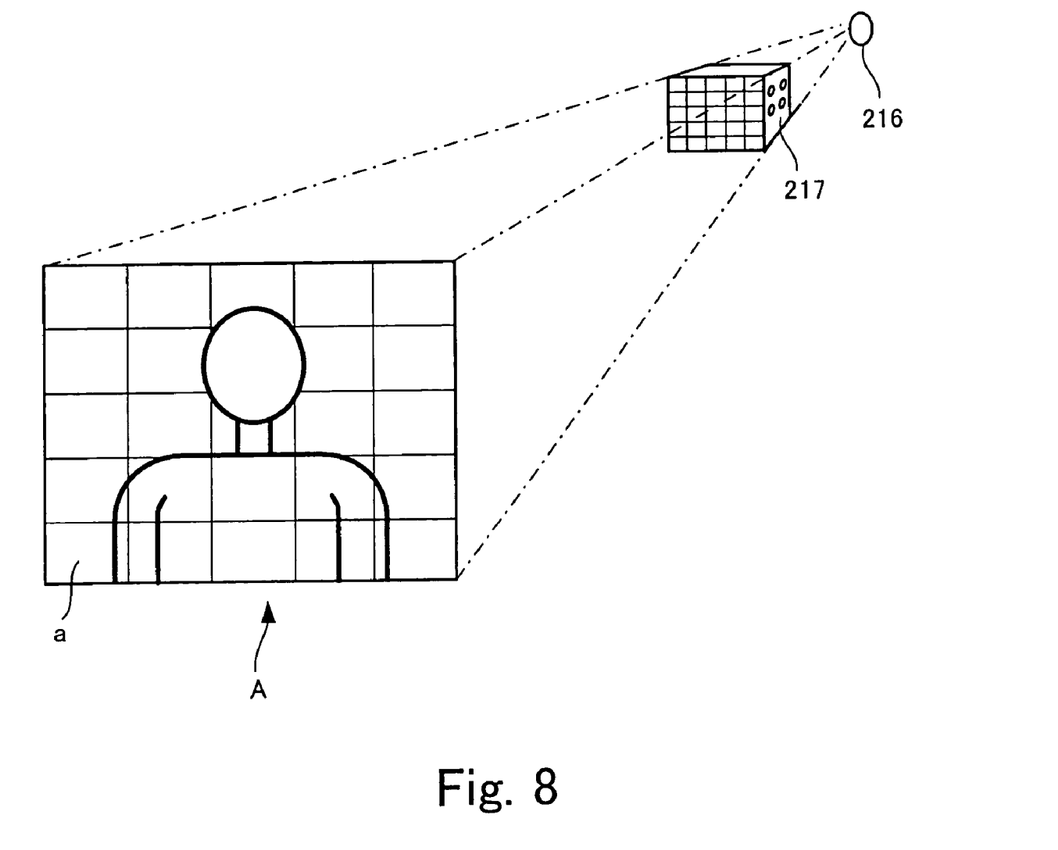
FIG. 8 is a diagram useful in understanding a lighting section and a LED light-mount adjusting section shown in FIG. 6.

FIG. 8 is a diagram useful in understanding the lighting section 216 and the LED light-mount adjusting section 217 shown in FIG. 7.

FIG. 8 shows the lighting section 216, the LED light-mount adjusting section 217 and a field A divided into areas "a." The LED light-mount adjusting section 217 is made of a liquid crystal device filled with liquid crystal cells whose light permeability and shadability are controlled. The LED light-mount adjusting section 217 has divided areas being in a one-to-one correspondence with the divided areas "a" of the field A.

Figure 9:
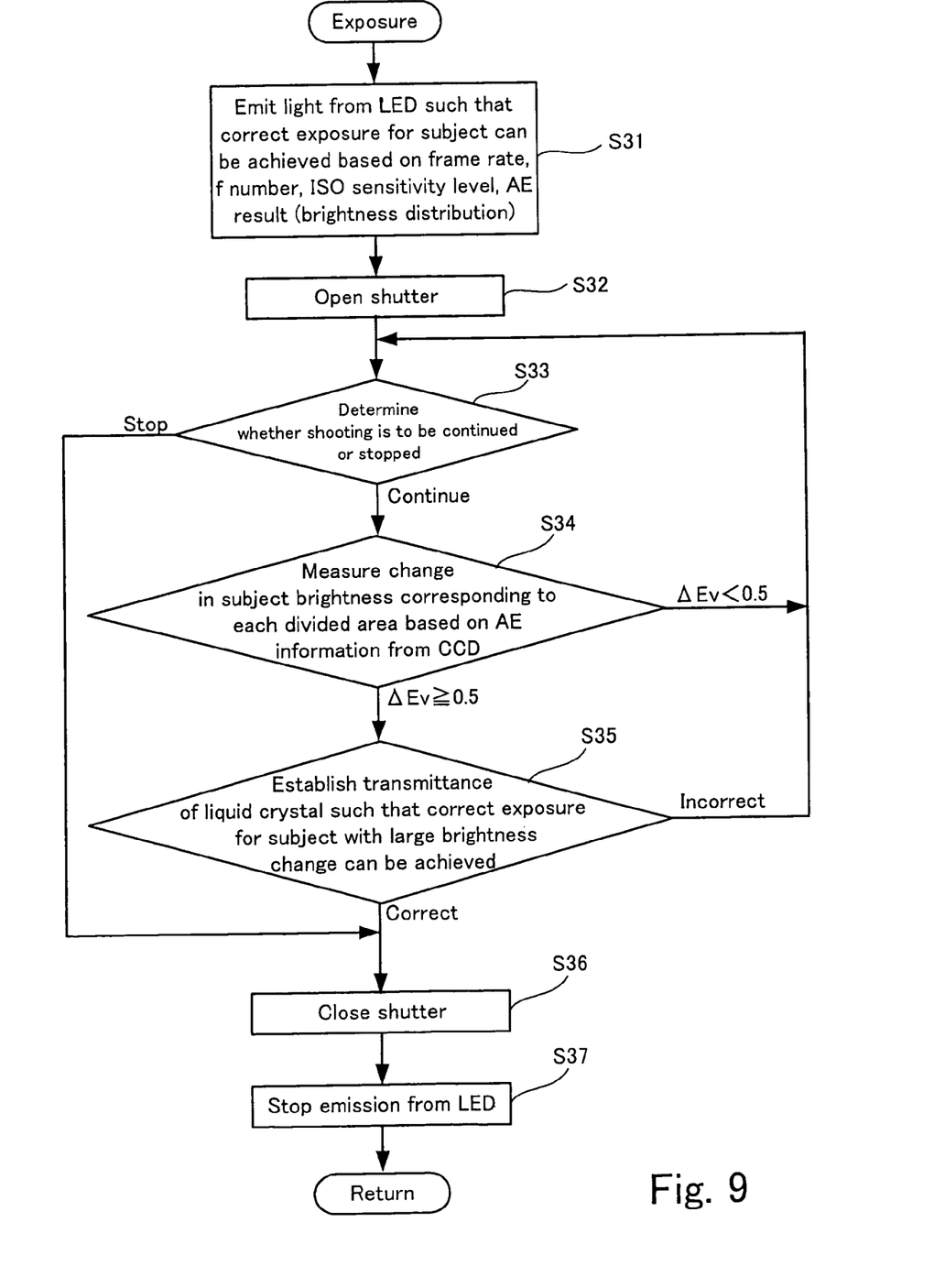
FIG. 9 is a flowchart showing the details of exposure processing in the digital camera shown in FIG. 6.

FIG. 9 is a flowchart showing the details of exposure processing in the digital camera 200 shown in FIG. 6.

At step S31, concentration distribution of the liquid crystal device is established such that correct exposure for a subject can be achieved based on frame rate, f number, ISO sensitivity level, and AE result (brightness distribution), and then, light is emitted from the LED. Subsequently, the shutter is opened at step S32 and the flow proceeds to step S33.

At step S33, it is determined whether shooting is to be continued or stopped. If it is determined that the shooting is to be stopped, the flow proceeds to step S36 which will be described later. On the other hand, if it is determined that the shooting is to be continued, the flow proceeds to step S34. At step S34, a change in subject brightness corresponding to each divided area is measured based on AE information from a CCD. As a result of this measurement, the flow goes back to step S33 when an exposure value ΔEv is below 0.5, whereas the flow proceeds to step S35 when an exposure value ΔEv is 0.5 or more.

At step S35, transmittance of the liquid crystal device is established such that correct exposure for a subject with a large brightness change can be achieved. Specifically, the flow goes back to step S33 when correct exposure is not achieved whereas the flow proceeds to step S36 when correct exposure is achieved. The shutter is closed at step S36 and subsequently, the emission from the LED is stopped at step S37, and the flow ends.

In this way, light distribution suitable for movie shooting may be realized by using the lighting section 216 having one LED and the LED light-mount adjusting section 217 employing liquid crystal.

Although digital cameras have been described above as embodiments of the invention, the invention is not limited thereto and may be applied to a camera built in a portable telephone, a vide camera, and the like.

What is claimed is:

1. An image-taking apparatus which includes an imaging device and generates image signals by forming a subject image on the imaging device, comprising:
   a lighting section that emits light to a field by independently controlling an amount of light for each of a plurality of areas into which the field is divided;
   a light-amount adjusting section that adjusts an amount of emitted light for each of the plurality of areas according to field conditions; and
   an autoexposure section that measures subject brightness for each of the plurality of areas,
   wherein the light-amount adjusting section adjusts an amount of emitted light for each of the plurality of areas based on subject brightness information from the autoexposure section.

2. The image-taking apparatus according to claim 1, wherein the autoexposure section measures subject brightness for each of the plurality of areas by using the imaging device.

3. An image-taking apparatus which includes an imaging device and generates image signals by forming a subject image on the imaging device, comprising:
   a lighting section that emits light to a field by independently controlling an amount of light for each of a plurality of areas into which the field is divided;
   a light-amount adjusting section that adjusts an amount of emitted light for each of the plurality of areas according to field conditions;

an autoexposure section that measures subject brightness for each of the plurality of areas; and an autofocus section that includes a distance-measuring sensor provided independently of the imaging device and measures a subject distance for each of the plurality of areas by using the distance-measuring sensor, wherein the light-amount adjusting section adjusts an amount of emitted light for each of the plurality of areas based on subject brightness information from the autoexposure section and subject distance information from the autofocus section.

4. An image-taking apparatus which includes an imaging device and generates image signals by forming a subject image on the imaging device, comprising:

a lighting section that emits light to a field by independently controlling an amount of light for each of a plurality of areas into which the field is divided; and a light-amount adjusting section that adjusts an amount of emitted light for each of the plurality of areas according to field conditions, wherein the lighting section includes light-emitting diodes that individually correspond to the plurality of areas and that each emit light to corresponding one of the plurality of areas.

* * * * *